United States Patent [19]

Stapleton

[11] 4,418,359
[45] Nov. 29, 1983

[54] OMNISPECTRAVISION

[75] Inventor: John J. Stapleton, East Brunswick, N.J.

[73] Assignee: International Telephone and Telegraph Corporation, New York, N.Y.

[21] Appl. No.: 359,451

[22] Filed: Mar. 18, 1982

Related U.S. Application Data

[62] Division of Ser. No. 157,136, Jun. 6, 1980.

[51] Int. Cl.³ .............................................. H04N 9/20
[52] U.S. Cl. ...................................... 358/65; 358/64; 358/242
[58] Field of Search ................... 358/21 R, 56, 64, 65, 358/242, 160

[56] References Cited

U.S. PATENT DOCUMENTS 4,070,691 1/1978 Smith et al. ........................... 358/65

Primary Examiner—Richard Murray
Attorney, Agent, or Firm—John T. O'Halloran

[57] ABSTRACT

A system for providing a visual color display of multi-spectral and/or multi-sensor data particularly that provided by a trichroic infrared scanning system, which includes the assignment of visible color signals to such data in a manner to maximize color discrimination of the viewer and allows the use of a conventional color display, particularly a CRT, to produce a real time color picture of the image that the data represents.

12 Claims, 7 Drawing Figures

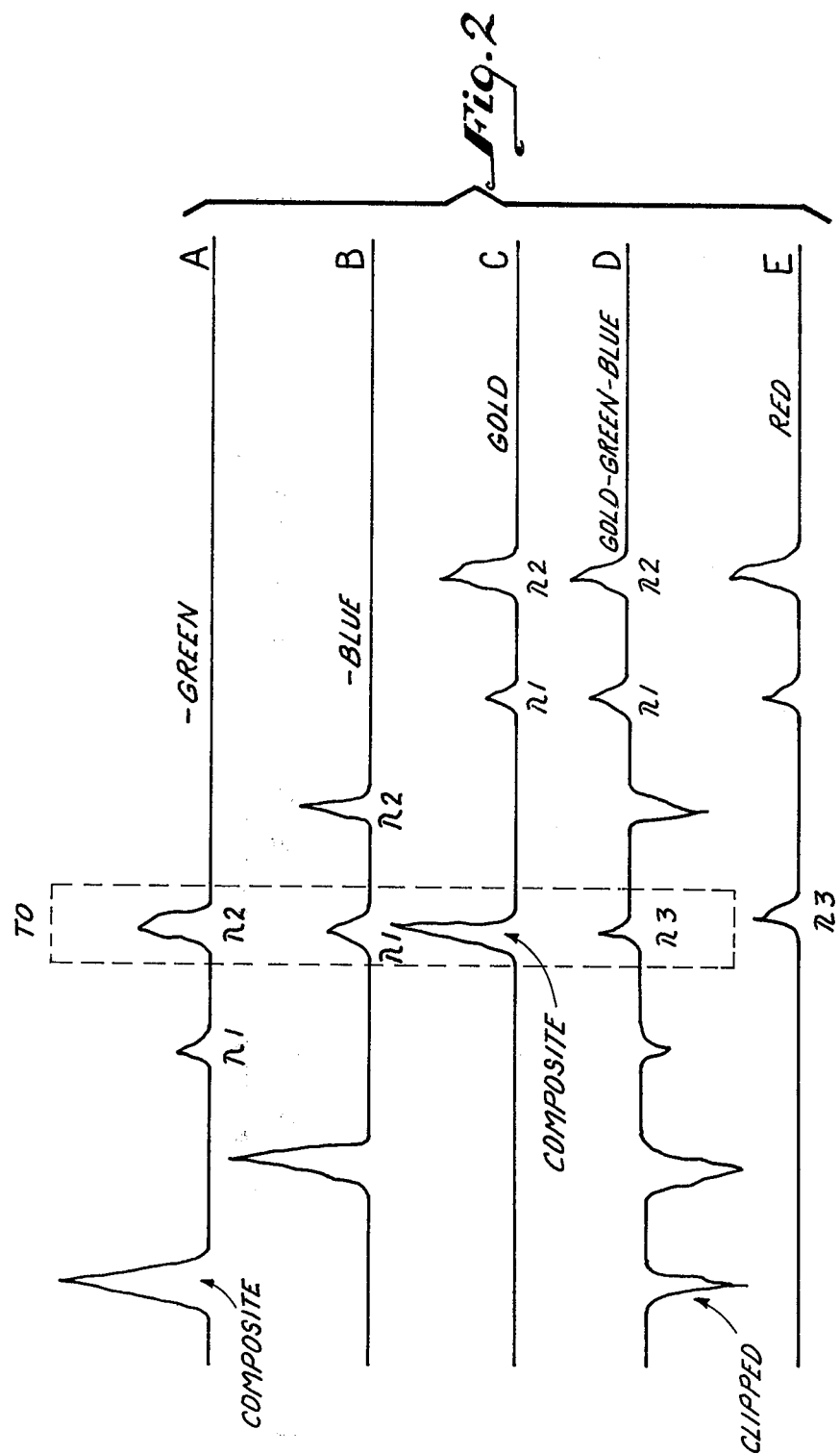

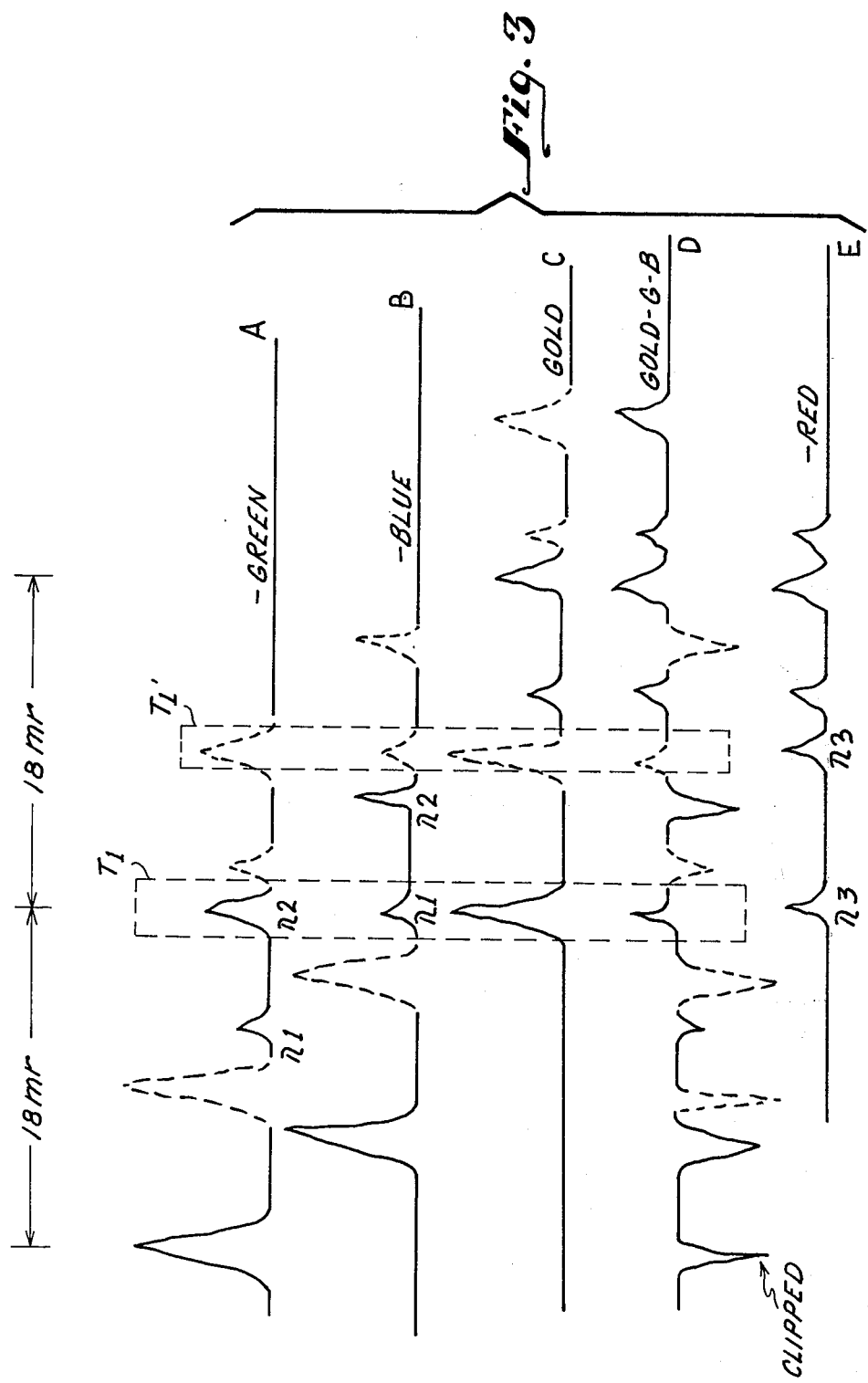

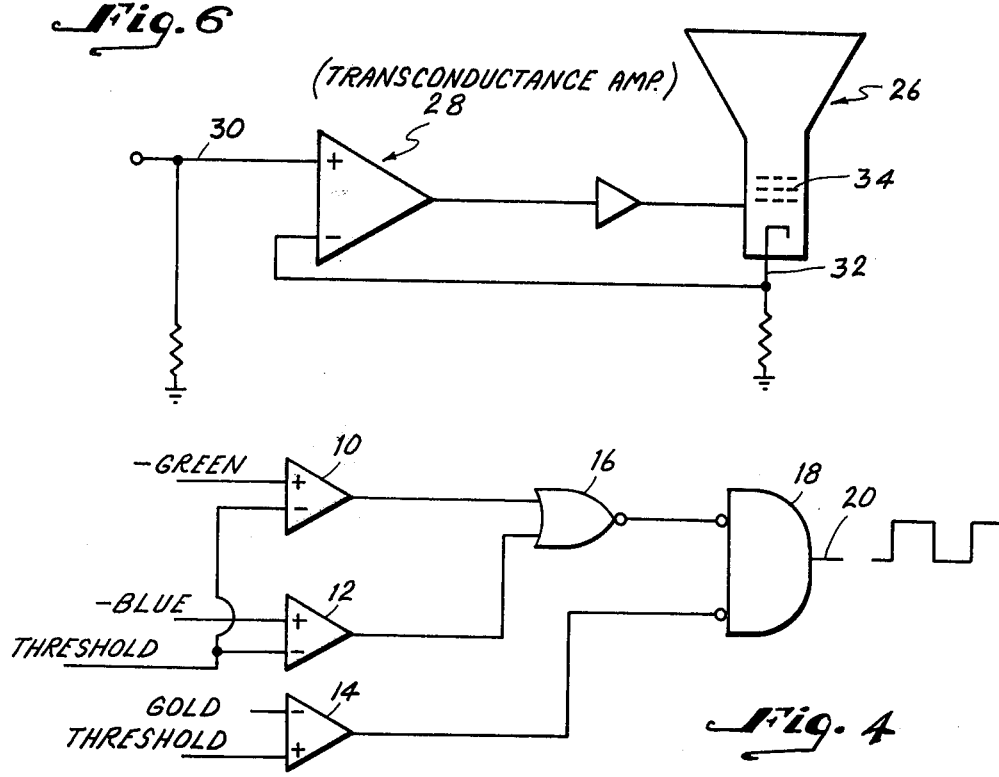
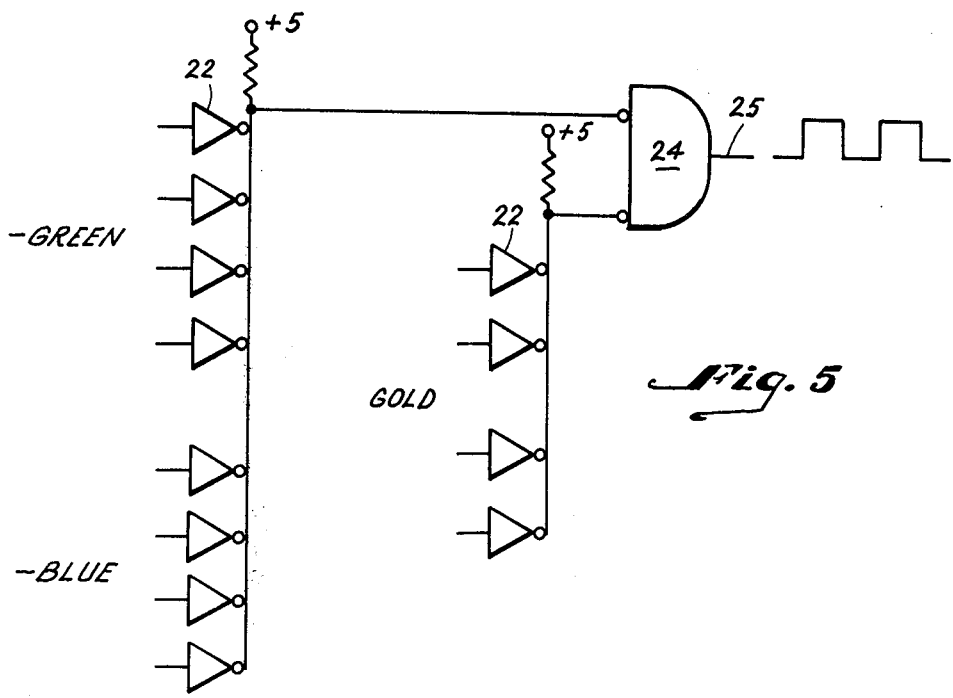

OMNISPECTRAVISION

This is a division of application Ser. No. 157,136, filed June 6, 1980.

FIELD OF THE INVENTION

The present invention relates to a system which is capable of providing an improved visual display of spectral data.

BACKGROUND OF THE INVENTION

There is presently provided numerous devices for displaying data which is based upon radar, infrared scanning, laser verification, etc. These may utilize cathode-ray tubes (CRT) or other display means which would provide image reproduction that can be monitored by a viewer.

In many applications, i.e., military, medical, environmental, etc., it is desirable, if not imperative, that a real time display of the image be provided which allows a human operator to effectively detect and recognize targets or items.

At low spatial frequencies, the chromatic response of the operator exceeds the achromatic response so that certain images which are indistinguishable in a monochrome display, would be descernable in a color display. For example, often it is necessary to distinguish a temperature variation of 0.1° K. within a 300° background which would be impossible in a monochrome arrangement.

Accordingly, it is advantageous to utilize pseudo or false color to discriminate multi-sensor data. While pseudo colors have been utilized in non-real time applications i.e., Landsat and ERT satellites mapping an original color or infrared image described by perhaps primary colors i.e., Red, Green, and infrared, it does not provide a real time display of linear functions of spectral signatures of the image.

While the use of digital scan conversion of such data for CRT displays would be advantageous, the use of conventional long persistent PPI or CRTs in conventional operational circuitry in displaying such data as pseudo-colors is limited. Present high resolution scan or image conversion and color display utilize costly cosmetic colors for manual modes of operation and usually make color cues as to possible targets questionable and often distracting.

In addition, since present infrared sensors, particularly that of the trichroic, multi-discriminant processing type, scan at high speeds, refresh electronics and memory is necessary to a read out at a T.V. frame rate to enable the operation to detect targets and to continually update the data displayed. Conventional color CRTs and video amplifier arrangements are ineffective in providing such displays and color code assignments in such arrangements would be diluted, decreasing their effectiveness.

SUMMARY OF THE INVENTION

Accordingly, it is an object of the invention to provide for a real time visual display of image data, particularly that relative to the infrared.

It is a further object to provide a digital color assignment of such image data which is weighted to maximize the ability of the operator to discriminate the existence of sought after targets.

It is a yet further object to provide for such a visual display of image data which may utilize conventional CRTs.

The present invention involves the utilization of color assignments or image data to display a color image. While the color assignments may readily incorporate a wide variety of data sources, i.e., laser returns, radar, TV camera signals etc., the discussion will use as an example the trichroic system of image scanning which provides pulses which correspond to infrared wavelengths or bands of the image being scanned. However, it should be noted that all multi-sensor data may be digitized and displayed.

In a trichroic system operation there is usually provided the spectral separation of incident radiation into three spectral bands, each of which may be detected by a single detector in time sequence. (See for example U.S. patent application Ser. No. 024,912 for a Trichroic Mirror filed Mar. 28, 1979, commonly assigned). The pulse output of the system may be in the form of a composite pulse and two sequential pulses corresponding to the infrared image and may be used in image processing and reproduction. Omnispectravision categorizes the ratios of the irradiance of three infrared wavelengths, and preferably assigns the subtractive colors −Red, (cyan) −Green (magenta) and −Blue (yellow) (hereinafter sometimes referred to as RGB) to the wavelengths to determine the presence of targets that are readily recognizable in a large field of view. Cool (300k°) backgrounds would be cyan, solar (6000k) clutter would be yellow, with midband target recognition maximized with magenta. This is done to optimize the discrimination of the visible colors of the CRT to the IR signals, and to provide a digital signal for each wavelength which is weighted for optimization.

The device serves to provide a digital signal which is utilized in a pixel by pixel mapping in real time of an originally invisible image which can be described by the three wavelengths or with multi-sensor data sets of multispectral or multisensor image planes of the same scene, to a visible color space defined by the display tristimulus values that are linear functions of the original image pixel value. This pixel by pixel mapping can be used in a color display which may be of the CRT type, however, unlike conventional CRT's, has unity gamma and color stability derived from the use of transconductance amplifiers, having the CRT as a feedback element.

In this regard, the transconductance amplifiers produce beam currents which are proportional to the input video voltage by driving the CRT grid and cathode within a feedback loop. Hence, the gamma is approximately unity, whereas, conventional color CRT gamma is 2.5. (Light output is proportional to the 2.5 power of input video voltage). Linearity of operation thus conforms to Grassman's rules of color and thus the color contrasts displayed are discerned as ratios since the eye-brain takes the logarithm of the difference signals (Log A−Log B=Log A/B).

Accordingly, the device provides a means of displaying a color image data utilizing a conventional CRT which is responsive to a color coded digital input, repeatable and subject to refresh memory, without dilution of color assignments. This digital input of the coded colors, which are weighted to provide an improved discernable difference between the colors assigned, serves to optimize viewer recognition of a target even in cluttered background and at low spatial frequencies.

BRIEF DESCRIPTION OF THE DRAWINGS

The above mentioned and other features and objects of this invention will become more apparent by reference to the following description taken in conjunction with the accompanying drawings.

FIGS. 2 and 3 are curves of waveforms illustrating a spectrally multiplexed signal of a trichroic scanning system shown in a time sequence overlap for a single and double target respectively.

FIGS. 4 and 5 are schematic representations of logic arrangements to unblank the CRT during operation incorporating the teachings of the invention.

FIG. 6 is a simplified schematic representation of a CRT contained as a feedback element of an operational amplifier incorporating the teachings of the invention.

DETAILED DESCRIPTION OF THE PREFERRED EMBODIMENT

The present invention proposes the assignment of false or pseudo color to multi-spectral data to maximize discrimination of the viewer to the presences of targets. This is in particular regard to spectral data received from infrared scanners utilizing a trichroic system. As aforementioned, a trichroic system usually provides a composite pulse with two sequential pulses relative to the particular infrared wavelengths of the image, for image processing and reproduction. (See for example FIGS. 2 and 3 later discussed)

To provide for maximization of the presence of targets, the infrared wavelength dispersed by the trichroic system are assigned a particular color which is digitally coded and weighted arbitrarily in a manner unrelated to the actual wavelength, for optimization. These color assignments maximize the hue and therefore the maximum discrimination of the viewer. In this regard, maximum discrimination can be found in hue along the bottom portion of a standard Kelly chart or in the $-$Green or magenta region. Accordingly, it has been found advantageous for color discrimination and in view of standard color codes to assign the subtractive colors $-$R, $-$G, and $-$B to the trichroic wavelengths or bands $\eta_3 \geq \eta_2 \geq \eta_1$.

The false or pseudo colors are utilized since color differences are more noticeable than achromatic displays especially at low spatial frequencies. Without brightness or contrast adjustments, there can be displayed 32 linear levels of luminance (photopic brightness) of each primary RGB, so that $(2^5)^3$ or 32,768 different shades are digitally addressable from one 15 bit word. While this 90 db dynamic range will be degraded by observer conditions, it can still provide 72 db dynamic i.e., 4096 digitally addressable colors, that are noticeably different.

The present system serves to categorize the ratio of the three infrared wavelengths of the system to determine the presence of target and optimize the discrimination of the colors RGB of the CRT by utilizing a weighted digital coding of the colors. In this regard, a weighting of RGB in a ratio of 2/4/1 respectively had been found effective in displaying the presence of a target with the color red arbitrarily chosen as indicating the sought after target.

To provide such digital coding, a weighted hexadecimal color-code cube was utilized, following the color code configuration of Maxwell, and numerically controlled by a computer to display the 4096 bins of information for each picture element. The hexadecimal color code divides the luminance contribution of each additive primary into 16 luminance levels producing equal steps measurable by a photopic spot brightness meter and due to the 2/4/1 weighting of the RGB, each code algebratically specifies the color and brightness and allows their simple addition and subtraction.

Figure 1:
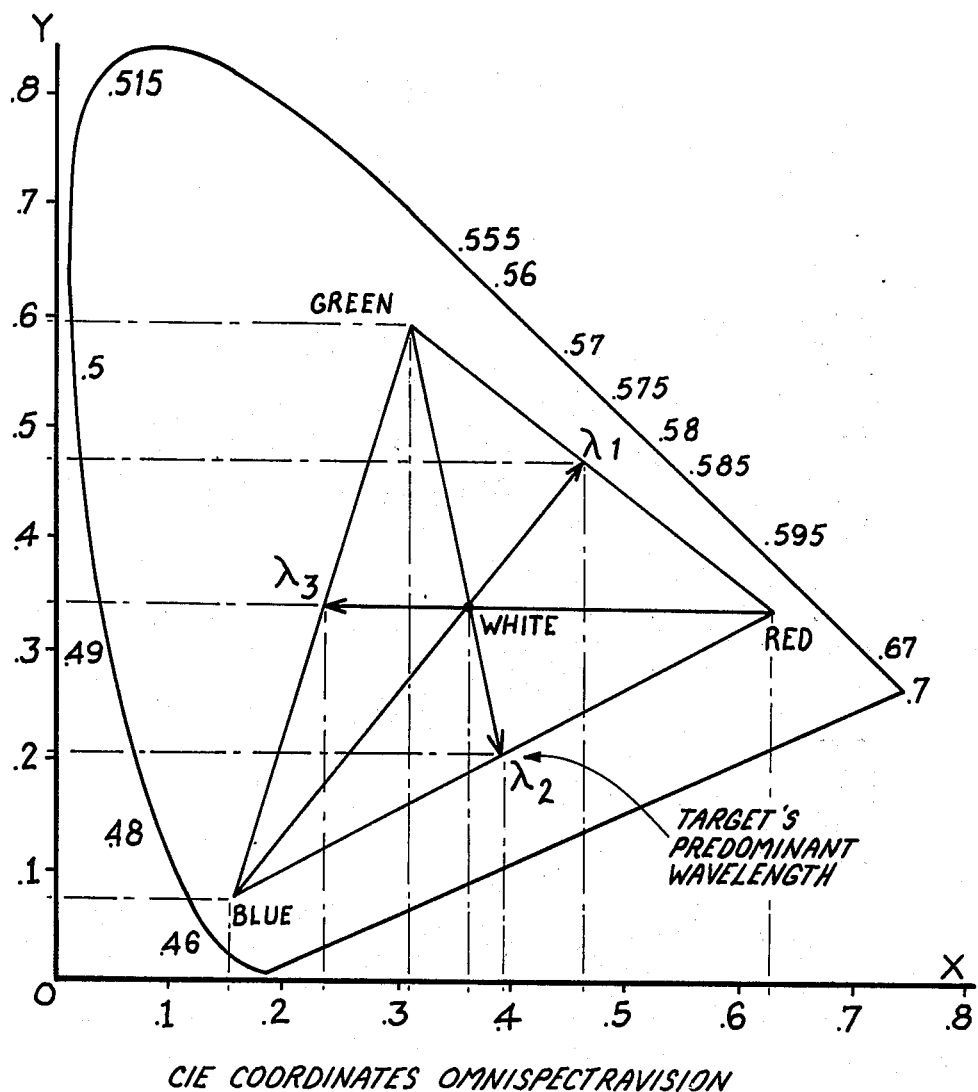
FIG. 1 is a graphic display of a chromaticity diagram in which the X and Y chomaciticity coordinates are plotted in rectangular coordinates for the present invention.

Each color of the 4096 bins is uniquely specified herein by only three hexadecimal alpha numerics with RGB weighted in terms of the CIE color coordinates (graphically illustrated in FIG. 1 with the point values shown by their X and Y coordinates) of the RGB phosphors or primaries, such that the composite (vector sum) of two primaries is in line with the complement of the third primary. In particular, the complement of green (i.e., magenta) is assigned to the predominant wavelength of the target as shown in the figure to optimize the visible hue variation as the intensity ratio of $\eta_1$, $\eta_2$ $\eta_3$ change. The use of this technique allows vector addition and subtraction of colors and allows the operator eye-brain combination to perform color ratio discrimination.

With regard now to FIGS. 2 and 3 there is shown wavelengths or time sequence pluses in an 18 mr dispersion provided by the trichroic scanning system. As shown a composite (3–5 um) pulse designated Gold and two sequential pulses designated $-$Blue and $-$Green referring to $\eta_1$ and $\eta_2$ respectively are provided and with the use of inexpensive analog codification and a digital delay line there may be produced a full color, flicker free display of the spectral and spatial signatures. In this regard, since a digital delay line i.e., from a CCD, or a RAM, is used for flicker free operation, a video output is provied which may readily be tapped in order to overlap the three sequential pulses.

As aforementioned, the visible colors of the CRT, (or any other type display) are assigned to the trichroic infrared signals to optimize the discrimination ratio and speed of recognition by the viewing operator. Subtractive colors $-$R, $-$G, and $-$B are assigned to infrared wavelengths $\eta_3 \geq \eta_2 \geq \eta_1$ respectively, which is indicated in the Figures. The signals from each of these are applied to the respective CRT provided for each of the colors as later discussed.

In FIGS. 2 and 3 each of the pulses or signals corresponding to $\eta_1$, $\eta_2$ and the composite signal (Gold) (corresponding to white) are shown in a time sequence as video readouts from a RAM or other digital delay. The signals or pulses for each $\eta_1$, $\eta_2$ and Gold are sychronized by the delays in the memory that correspond to the spatial dispersion of the scanner and allows for the signals or pulses to be overlapped for each pixel production and the determination of the pulse for $\eta_3$ to control the red gun as hereinafter discussed.

In FIG. 2, the waveform A represents the positive pule or signal corresponding to wavelength $\eta_2$ assigned the color $-$G at a point in time arbitrary designated To and shown by the phantom box which represents 1 mr resolution. This signal regulates the green gun in the CRT at To.

At a delay of 6 mr, the waveform B shows the time sequence position of the pulse or signal corresponding to wavelength $\eta_1$ assigned the color $-B$, which is positioned to be overlapped with that of $-G$ as will be discussed. This signal regulates the blue gun of the CRT at To.

At a delay of 18 mr, the waveform C shows the time sequenced position of the pulse or signal corresponding to the composite Gold, which is positioned to be overlapped with that of $-G$ and $-B$ as shown.

By the sychronization of the pulses or signals for the composite Gold, $\eta_2$ and $\eta_1$, the signal or pulse for $\eta_3$ which controls the red gun, may be determined by essentially subtracting the pulse for $\eta_2$ and/or $\eta_1$, depending if both or just one is present, from the composite pulse, leaving the signal for $\eta_3$ as shown in waveform D.

This subtracting of the $\eta_2$ and/or $\eta_1$ from the composite pulse may be effected by applying the signal corresponding to $\eta_2$ and $\eta_1$ to the inverting input of the operational amplifier arrangement shown in FIG. 7, while applying the signal corresponding to the composite pulse to its non-inverting input as will be later discussed. Negative values would be clipped as shown in waveform D of FIG. 2.

With regard to FIG. 3, this is similar to FIG. 2 in all respect with the exception of now depicting two targets, $T_1$ and $T_1'$ with the pulses or signals for each.

The 1 mr resolution is maintained by blanking in the absence of a composite pulse and a pulse corresponding to $-$Blue and/or $-$Green. Otherwise, transversal filtering for example would double the blur in azimuth rather than reducing the chrominance confusion, from 18 mr to 1 mr. Spectral shifts can only now occur when the pulses overlap exactly within the 18 mr dispersion.

Accordingly, in operation only when the wavelengths $\eta_2$ and/or $\eta_1$, are present and overlapped with the composite pulse for the determination of $\eta_3$, all three of which designate the pixel characteristics, are the grids of the CRT unblanked to allow color production of the pixel.

The coordination of the unblanking may be effected by the logic circuits shown in FIGS. 4 and 5 which corresponds to analog or digital pulse inputs respectively, whichever is desired. In this regard, FIG. 4 provides an analog logic circuit wherein analog pulses corresponding to $-$Green and $-$Blue may be applied at the non-inverting inputs of comparators 10 and 12 respectively. The inverting input of comparators 10 and 12 may together or separately have a voltage placed thereon to provide a threshold level which may be varied as desired so as to eliminate noise etc. Similarly, the comparator 14 is provided to receive the composite or Gold pulse at its non-inverting input with a threshold level capable of being regulated by a voltage placed at its non-inverting input as desired.

The output of the comparators 10 and 12 is fed to NOR gate 16, whose output connects to an input of AND gate 18. The output of comparator 14 connects also to the input of gate 18, with the results that only if a $-$Green, and/or $-$Blue pulse is present at comparator 10 or 12 and a composite pulse is present at comparator 14 does a positive output appear at 20.

This output pulse at 20 is then applied to the CRT control grids for each of the colors which regulates operation of the grids, coordinating the beam currents from the guns of a conventional CRT, as later discussed, so that all the colors for the particular pixel are produced at the same point in time to provide effective pixel by pixel mapping.

Similar unblanking can be provided by the logic circuit shown in FIG. 5. However, since this arrangement is for a digital input at the amplifiers 22, the threshold arrangement set forth with regard to FIG. 3 is not so easily provided. In other respects the operation of the circuit is the same as that of FIG. 3 and the occurance of an output 25 of AND gate 24 would correspond to the output 20 of gate 18 previously discussed.

The device intends to allow the utilization of a conventional CRT and the regulating of the control grids as aforementioned of the CRT to allow effective pixel reproduction based upon sychronized signals. However, unlike conventional CRTs, it has unity gamma and color stability derived from use of the CRT as a feedback element of transconductance amplifiers. In this regard, FIG. 5 is a somewhat simplified depiction of a CRT 26 contained as a feedback element of a transconductance operational amplifier 28. The transconductance amplifier 28 would be one of three for each of the color circuits for RGB.

In basic operation, a signal voltage corresponding to that for the particular color applied at the non-inverting input 30 of the amplifier 20 will be the same as the voltage at the cathode 32. The beam current at the cathode is varied by varying voltage of the grid 34 which is responsive to voltage variation at input 30. The voltage at the grid would also be responsive to pulse sychronizing provided, for example by the logic arrangements in FIGS. 4 and 5, thereby regulating the beam current.

Therefore, by varying the voltage input at 30, beam currents are produced which are proportional to the signal voltage as a result of driving of the CRT grid 34 of the cathode 32 within the feedback loop. Gamma is such an arrangement is approximately unity whereas the conventional color CRTs gamma is about 2.5. Thus the CRT can be linearly modulated and responds to display linear levels responsive to linear input signal voltage at input 30.

This linear operation provides a system that follows the input and allows for repeatability of the signal without dilution of possible targets. The output remains the same from time to time or from tube to tube without variation.

Figure 7:
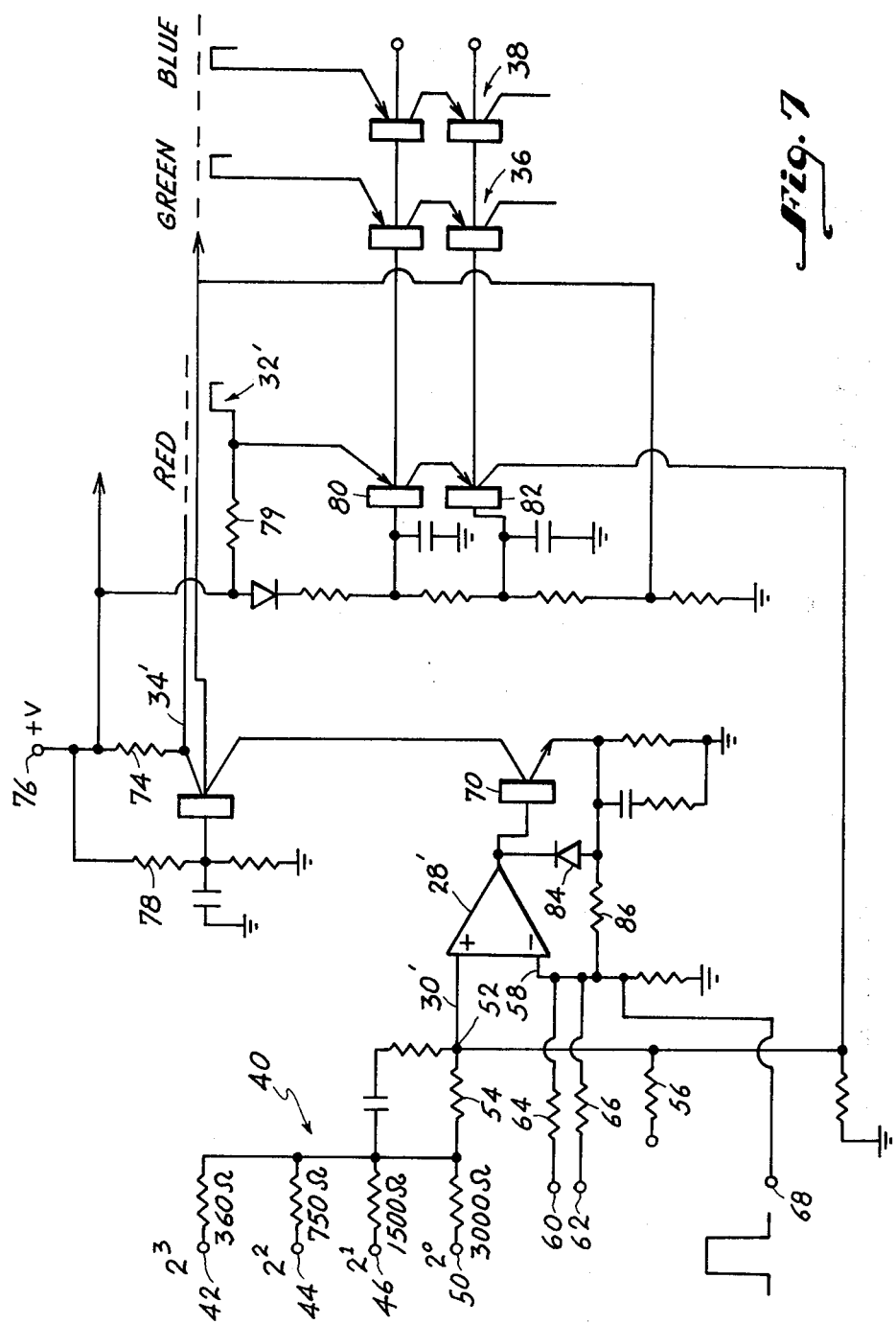
FIG. 7 is a detailed schematic representation of FIG. 6.

Turning now to FIG. 7, there is shown a detailed schematic representation of the feedback circuit of FIG. 6 which drives the CRT as a feedback element of the transconductance operational amplifier. As aforementioned, this would be one of three amplifiers, one for each of the primaries, $-$Blue, $-$Green, and $-$Red with $-$Red being representatively depicted. The same arrangement would be utilized for $-$Green and $-$Blue, which are shown connected with the CRT by the representative PNP cascode transistors 36 and 38 respectively, with minor modifications which will be explained. Parts corresponding to FIG. 6, will be similarly numbered with however a prime.

The input circuitry to the amplifier 28' consists of a four bit digital to analog convertor 40 having inputs 42, 44, 46 and 50. These correspond to the Gold bits, $2^0$-$2^3$ respectively and are connected to the summing point 52 via the scaling resistor 54. Also connected to point 52 is a bias voltage through a current limiting resistor 56.

At the inverting input 58 of the operational amplifier 28', the signals or pulses corresponding to $\eta_2$ and $\eta_1$ are applied via the inputs 60 and 62 and scaling resistors 64 and 66 respectively. The reason for this is that since the signal or pulse for −Red or $\eta_3$ is the remainder of subtracting $\eta_2$ and $\eta_1$ from the composite Gold, this operation is provided for by this circuitry. In the case of −Green and −Blue, this input would be unnecessary since the pulse or signal to control their guns is already known and would be applied to corresponding terminals $2^0$-$2^3$ for the −Green bits and −Blue bits respectively. In all other respects, however, the circuitry as illustrated for the −Red would be the same for −Green and −Blue.

Unblanking is provided by connecting the output of the logic arrangements shown in FIGS. 4 and 5 to the input 58 via the input terminal 68. This allows for the voltage which is applied at the grid 34' to be pulse modulated via the logic arrangement utilized so as to provide production of each pixel when the signals for each wavelength is sychronized.

The output of the operational amplifier 28' drives the base of transistor 70 which is cascode with transistor 72. In operation, a high voltage is applied to the grid via input 76, and as current to the base of transistor 70 increases, more current passes through the collector and emitter of transistor 70 and 72 causing a voltage drop across resistor 74 and thus decreasing the voltage at the grid. Biasing of resistor 72 is provided by resistor 78 which is interposed between the input 76 and the base of said transistor.

The feedback loop to the non-inverting input 30' of the operational amplifier 28' is provided by the transistors 70 and 72 whose collector connects to the input 76 and the cathode 32' via resistor 79. The loop is completed by connecting the cathode 32' to the emitter of transistor 80 which is cascode with transistor 82 which in turn connects to input 30'. This PNP cascode arrangement as shown, provides for a constant current source to the cathode 32' during operation.

In addition, the output of the amplifier 28' has a feedback connector to its inverting input via resistor 70, diode 84 and resistor 86.

In operation, an input video voltage is applied at inputs 42 through 50 which corresponds to the Gold bits $2^0$-$2^3$ respectively as aforementioned. This input video voltage may be the digital codification of the particular wavelengths as aforementioned. This applies at the input 30' of the operational amplifier 28', a voltage which increases and decreases for each coded pixel accordingly. A high voltage is applied to the grid 34' via input 76, and if during image display the input voltage decreases at inputs 42 to 50, this causes an increase in voltage at input 30' which in turn results in a decrease in the grid 34' voltage. This decrease in the grid voltage (going negative) pulling it down, causes a decrease in the beam current produced by the cathode. An increase in the grid voltage would provide for the opposite occurance and thereby provide for a linear beam current responsive to a video voltage input. Of course, the operational amplifier 28' should have enough gained so that the voltage at the input 30' results in the modulation of the grid 34' as aforementioned.

Also, as previously mentioned, the circuitry and arrangements for −Green and −Blue would operate in a similar fashion, with the noted modifications, through the unblanking of the signals at a specific time by applying the signal output from the logic arrangement to each amplifier. This allows for effective pixel by pixel mapping and provides for a display of the color coded image on a CRT responsive to the particular pseudo color assigned to the trichroic IR wavelengths.

In addition, it might be noted that the input signal to the Gold comparitors 14 in FIG. 4 may be taken from the summing point (for −Blue and −Green from their corresponding summing point). If a digital system is used as shown in FIG. 5, then the input signals placed at inputs $2^0$-$2^3$ for Gold could be placed upon the amplifiers 22 for Gold, (for −Blue and −Green from the corresponding $2^0$-$2^3$ bits to the amplifiers 22 for −Blue and −Green respectively).

While a somewhat detailed description of the preferred embodiment has been disclosed and described herein, its scope should not be limited thereby rather its scope should be determined by that of the appended claims.

What is claimed is:

1. A device for displaying in visible color multi-sensor or multi-spectral data which is in the form of video signals corresponding to said data, said device comprising:
   a plurality of color guns each of which is capable of providing a separate continuously controlled beam current, with at least one gun for each primary color to be displayed;
   a plurality of operational amplifiers each having an input, capable of receiving a video signal corresponding to a primary color with at least one differential cascade amplifier comprising each color gun, and a direct, emitter coupled semiconductor output; and
   a feedback loop connected between the output and the input of each operational amplifier respectively, incorporating in said loop a single color gun which is driven as a differential cascade feedback element of said amplifier a result of which is the production of a controlled beam current by the gun which varies linearly despite disturbances as the video signal to the amplifier varies during image production.

2. A device for displaying in visible color infrared signals produced by an infrared scanning system with said signals in the form of negative video color signals −R, −G, and −B assigned to said infrared signal, said device including:
   a plurality of color guns each of which is capable of producing a continuously controlled beam current, with at least one gun for each negative primary or complementary color to be displayed;
   a plurality of operational amplifiers with at least one differential cascade amplifier comprising each color gun, each amplifier having an input capable of receiving a video signal which corresponds to said infrared signal, and a direct coupled semiconductor output; and
   a feedback loop connected between the output and the input of each operational amplifier respectively, incorporating in said loop a single color gun which is driven as a differential, cascade feedback element of said amplifier, a result of which is the production of a continuously controlled beam current by each gun which varies linearly as the video signal to the amplifier varies during image production.

3. The device in accordance with claim 1 or 2 which includes a CRT and at least 3 color guns with one gun for each of the complementary colors −R, −G and −B to be displayed, with the linear beam currents from each of these guns simultaneously capable of creating a picture element on the CRT with spectral radiances proportional to invisible radiances or reflectances.

4. The device in accordance with claim 1 or 2 wherein the video signal is digital data word and the input to each of the amplifiers includes a digital to analog converter.

5. The device in accordance with claim 1 or 2 wherein the input of the amplifier connects to a first terminal input of each of the respective amplifiers.

6. The device in accordance with claim 1 or 2 which further includes a means capable of blanking the beam current at predetermined intervals when the dispersive video signals to each of the amplifiers are not synchronized for picture element production.

7. The device in accordance with claim 6 wherein said means includes a logic arrangement capable of accepting spectrally dispersive digital signals to control the blanking of the beam currents.

8. The device in accordance with claim 7 wherein the output of said logic arrangement is connected to a second terminal input of each respective amplifier.

9. The device in accordance with claim 6 wherein said means includes a logic arrangement capable of accepting spectrally dispersive analog signals and comparator threshold to control the blanking of the beam currents.

10. The device in accordance with claim 9 wherein the output of said logic arrangement is connected to a second terminal input of each respective amplifier.

11. A device for displaying invisible color infrared signals produced by a trichroic scanning system wherein each picture element includes a composite signal and at least two other signals corresponding to different infrared bands, said device including:
a plurality of color guns, each of which is capable of producing a beam current, with at last one gun for each infrared band to be displayed;
a plurality of operational amplifiers with at least one amplifier for each color gun, each amplifier having an input capable of receiving a video signal corresponding to an infrared band, and an output; and
a feedback loop connected between the output and input of each operational amplifier respectively, incorporating in said loop a single color gun which is driven as a feedback element of said amplifier, a result of which is the production of a beam current by each gun which varies linearly as the signal to the amplifier varies during image production.

12. The device in accordance with claim 11 which includes a means capable of regulating the operation of a gun based upon a signal which is a function of the composite and the two other signals.

* * * * *